United States Patent
Ishii et al.

(10) Patent No.: US 6,686,943 B2
(45) Date of Patent: Feb. 3, 2004

(54) CONTROL METHOD OF AN ELECTROPHOTOGRAPHIC RECORD APPARATUS AND IMAGE FORMATION APPARATUS INCLUDING CONTROLLING DEVELOPING BIAS AND PHOTOCONDUCTOR SURFACE POTENTIAL

(75) Inventors: Masayoshi Ishii, Ibaraki (JP); Keisuke Kubota, Ibaraki (JP); Teruaki Mitsuya, Ibaraki (JP); Shintaro Yamada, Ibaraki (JP)

(73) Assignees: Hitachi Printing Solutions, Ltd., Ebina (JP); Hitachi Ltd., Tokyo (JP)

( * ) Notice: Subject to any disclaimer, the term of this patent is extended or adjusted under 35 U.S.C. 154(b) by 0 days.

(21) Appl. No.: 10/193,188

(22) Filed: Jul. 12, 2002

(65) Prior Publication Data

US 2003/0012578 A1 Jan. 16, 2003

(30) Foreign Application Priority Data

Jul. 16, 2001 (JP) .................................. P.2001-214838
Apr. 10, 2002 (JP) .................................. P.2002-107655

(51) Int. Cl.[7] ............................................. G03G 15/00
(52) U.S. Cl. ......................... 347/133; 347/140; 399/49
(58) Field of Search ............................. 399/46, 49, 51, 399/55; 347/132, 133, 140, 131

(56) References Cited

U.S. PATENT DOCUMENTS

| | | | |
|---|---|---|---|
| 5,565,995 A | * 10/1996 | Yamada et al. | 347/133 |
| 5,666,588 A | * 9/1997 | Uchiyama et al. | 399/44 |
| 5,920,747 A | * 7/1999 | Takemoto et al. | 399/55 |
| 6,288,733 B1 | * 9/2001 | Nakazawa et al. | 347/133 |
| 2001/0046390 A1 | * 11/2001 | Kamiya | 399/46 |

FOREIGN PATENT DOCUMENTS

JP 11-15214 1/1999

* cited by examiner

*Primary Examiner*—Joan Pendegrass
(74) *Attorney, Agent, or Firm*—McGinn & Gibb, PLLC (57) ABSTRACT

An image formation apparatus for keeping secularly stable image quality for all image patterns if change in the charge amount of a developer caused by environment variation or over time or change in the photoconductor characteristic occurs in electrophotographic record apparatus. A test patch image formed on a photoconductor by a parallel electric field is detected by an image density sensor, the developing bias and the photoconductor surface potential are controlled so that the density detected by the image density sensor becomes constant, a test patch image formed on the photoconductor by a peripheral electric field is detected by the image density sensor with the control condition of the image density sensor maintained, and the light application amount in which an image area of a several-dot width adjacent a blank paper part is exposed to light is controlled so that the density detected by the image density sensor becomes constant.

20 Claims, 5 Drawing Sheets

CONTROL METHOD OF AN ELECTROPHOTOGRAPHIC RECORD APPARATUS AND IMAGE FORMATION APPARATUS INCLUDING CONTROLLING DEVELOPING BIAS AND PHOTOCONDUCTOR SURFACE POTENTIAL

BACKGROUND OF THE INVENTION

1. Field of the Invention

This invention relates to an electrophotographic record apparatus for rendering an image visible using coloring particles of toner, etc., such as a printer, a facsimile, or a copier and to a control method thereof.

2. Background Art

A control method an electrophotographic record apparatus in a related art will be discussed. A record apparatus using electrophotography includes a print photo process of rendering coloring particles visible on the surface of a record body as an image and a fixing process of transferring the coloring particle image rendered visible to the record body and fixing the image. Powder called toner dedicated to electrophotography is used as the coloring particles. In the charging step, the full surface of a photoconductor is once charged and subsequently in the light exposure step, light is applied, thereby partially discharging. A potential contrast based on the charge area and the discharge area is formed on the surface of the photoconductor and is called an electrostatic latent image.

In the developing step following the light exposure step, first the toner images of coloring particles are charged. As the toner charging method, a dual-component developing method using carrier beads or a mono component developing method of charging by friction with a toner member, etc., is available. On the other hand, to render an electrostatic latent image visible, a method called bias developing is often used. In the bias developing, a bias voltage is applied to a developing roller and toner particles charged by the action of an electric field occurring between the latent image potential formed on the photoconductor surface and the developing roller are separated from the developer on the surface of the developing roller and moved to the photoconductor surface for forming an image. The above-mentioned charge potential or discharge potential may be used as the latent image potential (namely, the potential of the image formation portion of the photoconductor). Generally, the method of using the charge potential as the latent image potential is called normal developing method and the method of using the discharge potential is called inverse developing method.

The charge potential or discharge potential, whichever is unused as the latent image potential, is called background potential. The bias voltage of the developing roller is set midway between the charge potential and the discharge potential, and the difference between the bias voltage of the developing roller and the latent image potential is called developing potential difference. Likewise, the difference from the background potential is called background potential difference. If the developing potential difference is large, the formed electric field (called developing electric field) becomes strong and thus the developing performance is enhanced. On the other hand, the background potential difference affects the quality of the background portion of an image and if the background potential difference is small, fogging to the background portion increases.

By the way, the charge amount of toner has close relationship with the developing performance. As the charge amount of toner is large, the developing performance in the same developing electric field strength is degraded.

Next, varying of the developing performance with time will be discussed. The varying factors of the developing performance with time are roughly classified into those of the charge amount of a developer with time and those of the developing electric field with time. Generally, the charge amount of toner easily varies with humidity in the atmosphere; as the humidity is low, the charge amount increases and as the humidity is high, the charge amount decreases. With the dual-component developing, the surface state of toner and carrier beads changes with time due to friction with an agitation member, etc., and the charge amount of toner changes.

On the other hand, it is known that the potential of the discharge area formed by light exposure varies with temperature change of a photoconductor, humidity change of the atmosphere, or film thickness change with time although the light exposure amount is constant. The potential of the discharge area varies markedly when an intermediate potential area incompletely discharged is provided in such a manner that insufficient light exposure amount is given.

By the way, for line images, dots, etc., the influence of the edge effect of an electric field is large and the strength of the developing electric field is larger than that of the developing electric field (parallel electric field) occurring in the inside of a solid area (solid image part). Hereinafter, the electric field having larger strength than the parallel electric field because of the influence of the edge effect will be referred to as peripheral electric field.

As the film thickness of a photoconductor changes with time, the strengths of the parallel electric field and the peripheral electric field change and the strength ratio between the parallel electric field and the peripheral electric field also changes even under the same developing potential difference.

To make the image quality constant over time, it is necessary to correct change in developing performance and variation in the developing electric field caused by variation in the charge amount of the developer described above.

To correct the density variation of a print image occurring with change in the charge amount of the developer, the following method is known: Before an image is formed, a test patch latent image is formed on a photoconductor by a laser write unit and is developed by a developing machine to form a test patch image and then the reflection density (image density) of the test patch image is measured by an optical image density sensor placed upstream from a cleaning unit and if the reflection density (image density) differs from the default value, the developing bias, the charger grid voltage, toner replenishment, and the like are controlled.

As a correction method of variation in the developing electric field, the following method is known: The potential on the surface of a photoconductor is detected by a potential sensor and the film thickness of the photoconductor is detected by some method and the laser light amount is changed so as to make the developing electric field constant for controlling the potential on the surface of the photoconductor, for example, as described in JP-A-11-15214.

Further, a method of using both control of the optical image density sensor and control of the photoconductor potential sensor as mentioned above is also known.

In the related art described above, the light exposure amounts in the line image and the dot image part wherein developing of a peripheral electric field is mainly performed and the solid area (solid image part) wherein developing of a parallel electric field is mainly performed are changed at the same time and thus if the image quality in the line image and the dot image part takes precedence over that in the solid area for stabilizing the image quality, the density of the portion developed by the parallel electric field at the center is lowered in the solid area (solid image part) wherein the parallel electric field and the peripheral electric field are mixed; this is a problem.

SUMMARY OF THE INVENTION

It is an object of the invention to provide an image formation apparatus for keeping secularly stable image quality for all image patterns if change in the charge amount of a developer caused by environment variation or over time or change in the photoconductor characteristic occurs in electrophotographic record apparatus.

To accomplish the object, a test patch image formed on a photoconductor by a parallel electric field is detected by an image density sensor, the developing bias and the photoconductor surface potential are controlled so that the density detected by the image density sensor becomes constant, a test patch image formed on the photoconductor by a peripheral electric field is detected by the image density sensor with the control condition of the image density sensor maintained, and the light application amount in which an image area of a several-dot width adjacent a blank paper part is exposed to light is controlled so that the density detected by the image density sensor becomes constant.

DETAILED DESCRIPTION OF THE PREFERRED EMBODIMENTS

Referring now to the accompanying drawings (FIGS. 1 to 9), there is shown one embodiment of the invention.

Figure 1:
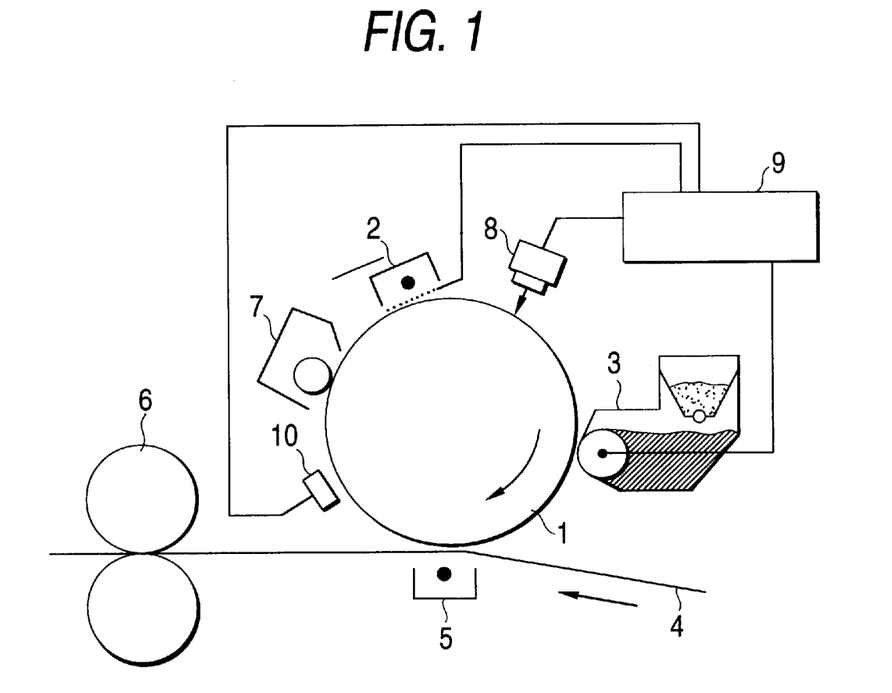
FIG. 1 is a schematic drawing of a record apparatus according to an embodiment of the invention.

FIG. 1 is a drawing to schematically represent the cross section of a record apparatus of the embodiment. Numeral 1 denotes a photoconductor drum, numeral 2 denotes a scorotron charger, numeral 3 denotes a developing machine, numeral 4 denotes record paper, numeral 5 denotes a transfer machine, numeral 6 denotes a fuser, numeral 7 denotes a cleaner, numeral 8 denotes a light exposure unit, numeral 9 denotes a controller, and numeral 10 denotes an optical image density sensor.

A latent image with a resolution of 600 dpi is formed on the surface of the photoconductor drum 1 uniformly charged by the scorotron charger 2 by the light exposure unit 8 based on an image signal. After this, toner is developed by the developing machine 3. The toner developed on the surface of the photoconductor drum 1 is transferred to the record paper 4 by the transfer machine 5. After this, the transferred toner image is fused by the fuser 6 to fix the image on the record paper 4. Toner not transferred and remaining on the surface of the photoconductor drum 1 is collected by the cleaner 7 and the process is terminated.

In the embodiment, a test patch latent image of a predetermined image pattern is formed on the photoconductor by the light exposure unit 8 and is developed by the developing machine 3 to form a test patch image and then the reflection density of the test patch image is detected by the optical image density sensor 10, and grid voltage Vg of the scorotron charger, developing bias Vb, and the light exposure amount of the light exposure unit 8 can be adjusted by the controller 9 based on the detection value of the reflection density.

Figure 2:
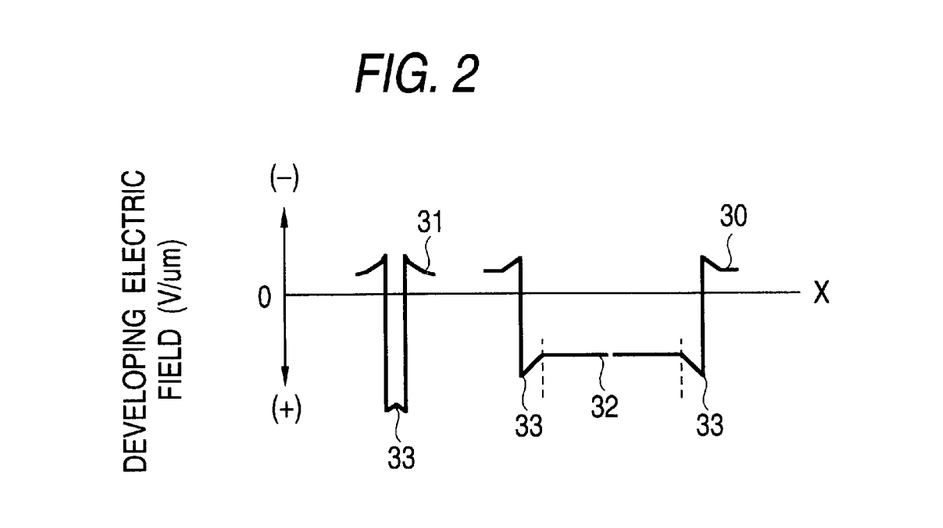
FIG. 2 is a drawing to schematically represent a developing electric field occurring when a solid image is developed and a developing electric field occurring when dots, a line image, or the like is developed according to the embodiment of the invention.

FIG. 2 is a drawing to schematically represent a developing electric field occurring when a solid image is developed and a developing electric field occurring when dots, a line image, or the like is developed with the horizontal axis as position on the photoconductor. (30) corresponds to the developing electric field occurring when a solid image is developed and (31) corresponds to the developing electric field occurring when dots, a line image, or the like is developed. The inside of the solid image is an area not receiving the influence of the edge effect of an electric field and the developing electric field occurring in this area is called parallel electric field, indicated by (32) in FIG. 2. On the other hand, the edges of the solid image, the dots, and the line image receive the influence of the edge effect of an electric field and an electric field stronger than the parallel electric field occurs. The developing electric field occurring in the edges of the solid image, the dots, and the line image is called peripheral electric field, indicated by (33) in FIG. 2. For the dots and the line image, a larger amount of toner is developed by the peripheral electric field as compared with the inside of the solid image.

In the record apparatus, an image signal is input to memory before light exposure and a portion of a predetermined number of pixels adjacent to the blank paper part of every image is detected by a pattern matching technique. The light exposure control means 9 controls so that the portion of a predetermined number of pixels adjacent to the blank paper part is exposed to light in light exposure amount E2 and others are exposed to light in light exposure amount E1.

The predetermined number of pixels adjacent to the blank paper part is set equal to or less than the number of pixels corresponding to the width of the peripheral electric field occurring in the edge of a solid image. In the embodiment, a peripheral electric field occurs over a width of about 200 μm in the edge of a solid image and corresponds to the number of pixels of about five dots with a resolution of 600 dpi. To make the strength of the peripheral electric field the same as that of the parallel electric field, the pixels of five dots where the peripheral electric field occurs needs to be set to the predetermined number of pixels, but it was found by an experiment that to correct variation in the peripheral electric field, the image quality of dots and line images can be stabilized with the smaller number of pixels.

Figure 3:
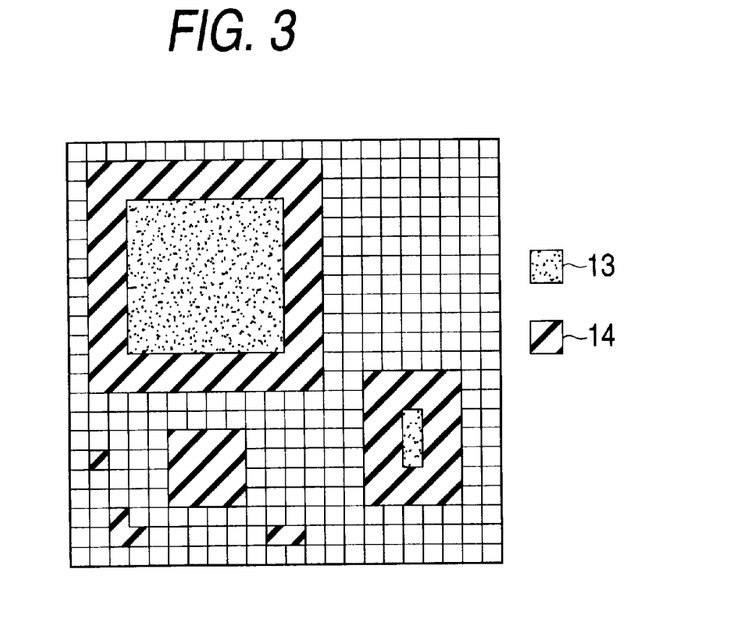
FIG. 3 is a schematic representation to show each two-dot-width portion adjacent to a blank paper part and other portions using a random image pattern according to the embodiment of the invention.
Figure 4:
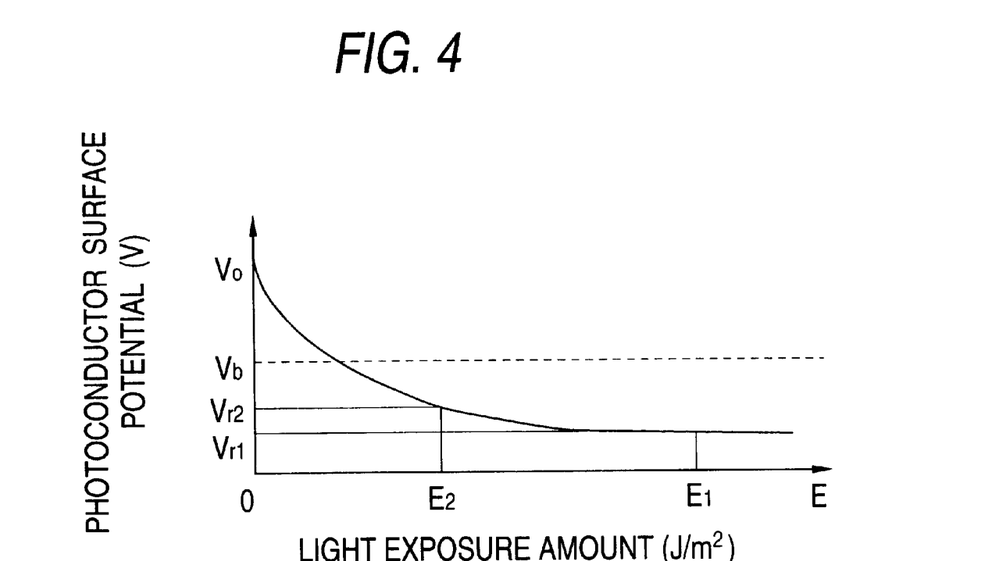
FIG. 4 is a schematic representation to show the light response characteristic of a photoconductor drum according to the embodiment of the invention.

Therefore, in the embodiment, the predetermined number of pixels adjacent to the blank paper part was set to two dots. In FIG. 3, each two-dot-width portion adjacent to the blank paper part detected in a random image pattern is indicated by (14) and any other portion is indicated by (13). The two-dot-width portion (14) adjacent to the blank paper part detected is an area of small image width or an edge of a solid image and is an area wherein the peripheral electric field is dominant. Next, the relationship between the light exposure amounts E1 and E2 will be discussed. FIG. 4 is a drawing to show the light response characteristic of the photoconductor drum 1. Horizontal axis E indicates the light exposure amount in terms of light energy input to the photoconductor drum 1. The vertical axis is the potential of the photoconductor drum 1 in a given time after light exposure. V0 on the vertical axis denotes the background potential in developing.

Vr1 on the vertical axis denotes the potential on the photoconductor drum 1 corresponding to the light exposure amount E1 and Vr2 denotes the potential on the photoconductor drum 1 corresponding to the light exposure amount E2. Vb denotes the bias voltage of the developing machine and Vb-Vr1 and Vb-Vr2 denote developing potential differences.

That is, for the edge of a solid area, a line image, or dots where the edge effect of an electric field acts strongly, Vb-Vr2 is used as the developing potential and for the solid area (solid image), Vb-Vr1 is used as the developing potential. Change in the developing performance accompanying secular change in the electrostatic latent image on the photoconductor surface and that caused by variation in the charge amount of a developer will be discussed.

When the film thickness of the photoconductor decreases due to abrasion as the print amount proceeds, the potential of a charged area is controlled constant by a charger using a scorotron technique, but the potential of a discharge area (discharge potential) rises. The discharge performance is degraded markedly when an intermediate potential area incompletely discharged is provided in such a manner that insufficient light exposure amount is given. In the embodiment, the intermediate potential corresponds to Vr2. The described potential change lessens the developing potential difference and acts in the direction of lowering the developing electric field.

On the other hand, in addition to the characteristic, a decrease in the photoconductor film thickness acts in the direction of increasing the developing electric field in the same developing potential difference. A decrease in the developing electric field caused by a decrease in the developing potential difference is applied to both of peripheral electric field and internal parallel electric field portion. However, since the increase in the developing electric field caused by the film thickness decrease acts only on the peripheral electric field, the optimum light exposure amount for keeping the density of a solid area constant over time differs from that for keeping the density of a line image, a dot, or an edge of the solid area constant over time.

On the other hand, generally the charge amount of toner easily varies with humidity in the atmosphere; as the humidity is low, the charge amount increases and as the humidity is high, the charge amount decreases. With the dual-component developing, the surface state of toner and carrier beads changes with time due to friction with an agitation member, etc., and the charge amount of toner changes. Since variation in the developing performance caused by variation in the charge amount of a developer affects the whole image of a solid area and that of a line image, a dot, or an edge of the solid area in the same ratio, the variation in the developing performance caused by the variation in the charge amount of the developer can be corrected by controlling Vb for increasing or decreasing the developing potential differences Vb-Vr1 and Vb-Vr2 by the same magnitude.

Figure 5:
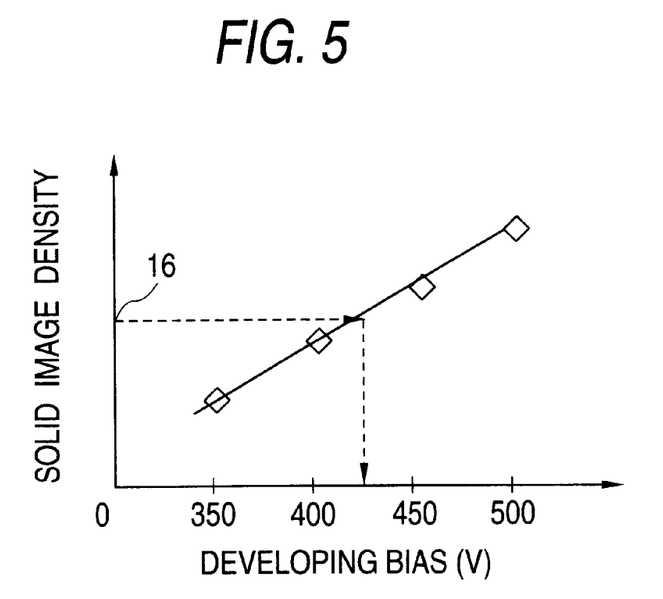
FIG. 5 is a schematic representation to show the relationship between developing bias Vb and solid image density obtained by test patch image detection according to the embodiment of the invention.
Figure 6:
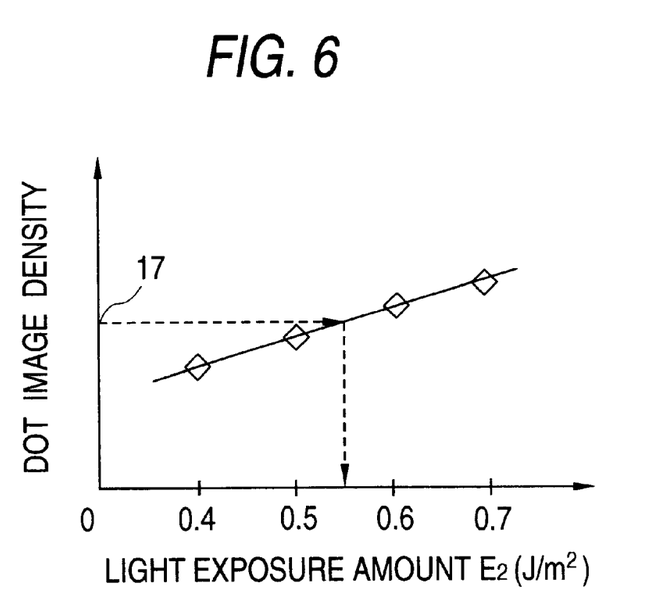
FIG. 6 is a schematic representation to show the relationship between light exposure amount E2 and dot image density obtained by test patch image detection according to the embodiment of the invention.

Next, a print photo control method will be discussed with reference to FIGS. 5 and 6. To begin with, several test patch latent images of solid images are prepared on the photoconductor inconstant light exposure amount E1. Next, with the difference between the developing bias Vb and the grid voltage Vg of the scorotron charger set, for example, to 50 V constant, Vb and Vg are changed several points at intervals of 50 V and the test patch latent image is developed to form a test patch image. Next, the image density in the inside of the test patch image of the solid image (area developed by a parallel electric field) is measured by the optical image density sensor 10 and the relationship between the developing bias Vb and the solid image density shown in FIG. 5 is obtained. From FIG. 5, the value of the developing bias Vb of target solid image density 16 is determined by primary approximation. The grid voltage Vg of the scorotron charger is determined Vb+150 V.

Next, several test patch latent images of images wherein developing of a peripheral electric field is mainly performed are prepared on the photoconductor while the light exposure amount E2 is being changed under the conditions of the developing bias Vb and the grid voltage Vg of the scorotron charger determined above. The test patch latent image was a dot image in a constant area percentage (for example, 50%). The test patch latent image is developed to form a test patch image and then the image density in the test patch image is measured by the optical image density sensor 10 and the relationship between the light exposure amount E2 and the dot image density shown in FIG. 6 is obtained. From FIG. 6, the value of the light exposure amount E2 of target dot image density 17 is determined by primary approximation.

The print photo control described above is performed periodically when image formation apparatus power is turned on and later at print job break. In the image formation apparatus using cut forms as record media, during continuous printing, a test patch image with dots in a predetermined area percentage to be detected by the optical image density sensor maybe formed on a space between print papers at every one or given number of sheets of the print paper. When the image density of the test patch image with dots in the constant area percentage exceeds a given variation allowable range, the printing may be forcibly terminated and the print photo control described above may be performed.

Figure 7:
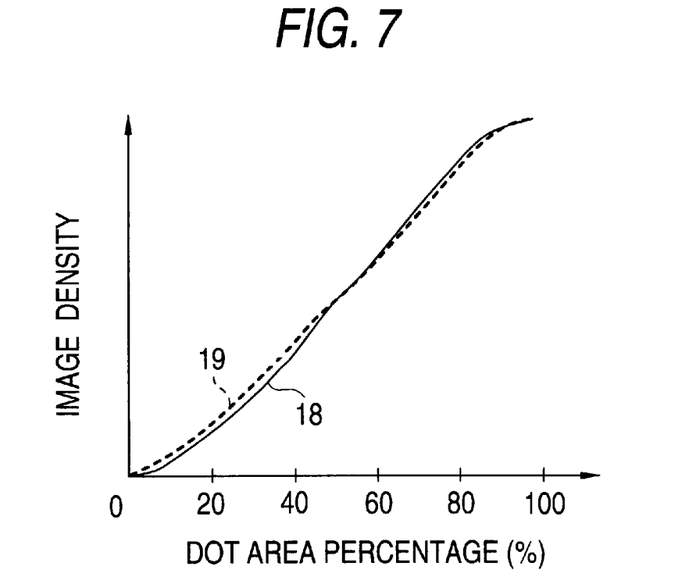
FIG. 7 is a schematic representation to show a gradation curve of an initial image and a gradation curve after printing 500000 pages in comparison when the area percentage of a test patch of a dot image is 50% according to the embodiment of the invention.
Figure 8:
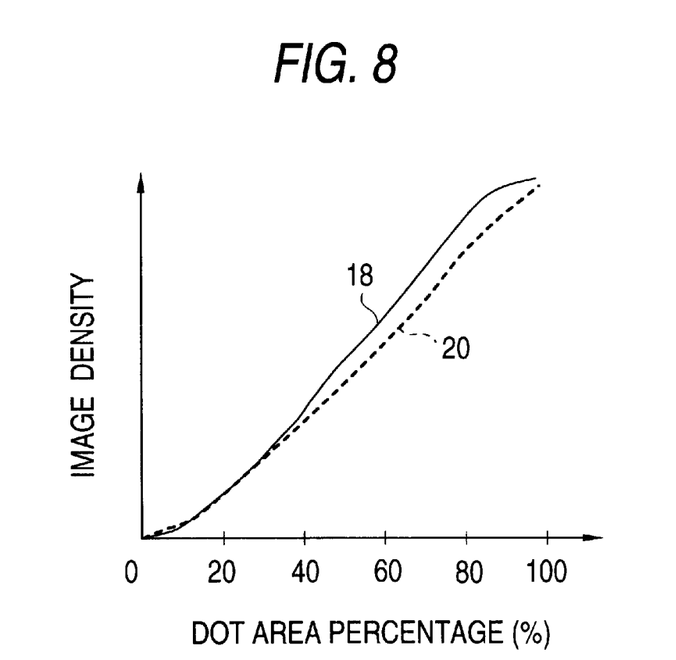
FIG. 8 is a schematic representation to show a gradation curve of an initial image and a gradation curve after printing 500000 pages in comparison when the area percentage of a test patch of a dot image is 20% according to the embodiment of the invention.
Figure 9:
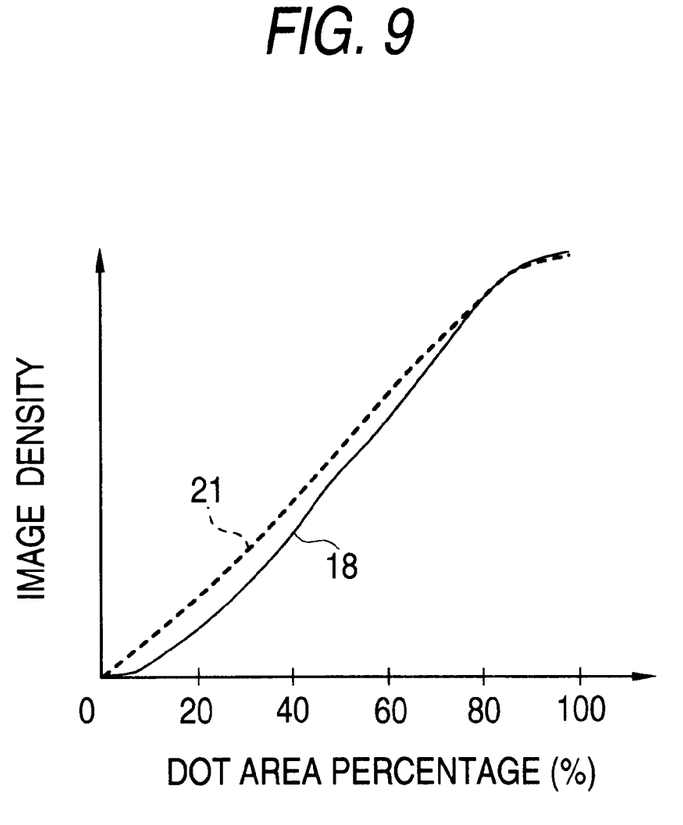
FIG. 9 is a schematic representation to show a gradation curve of an initial image and a gradation curve after printing 500000 pages in comparison when the area percentage of a test patch of a dot image is 80% according to the embodiment of the invention.

Next, the image quality difference when the area percentage of the test patch of a dot image formed on the photoconductor is changed in the print photo control method described above will be discussed. FIGS. 7, 8, and 9 show each a gradation curve of an initial image and a gradation curve after printing 500000 pages in comparison when the print photo control method described above is applied to an actual machine; the area percentage of the test patch of the dot image is 50% (FIG. 7), 20% (FIG. 8), and 80% (FIG. 9). In the figures, numeral 18 denotes a gradation curve of an initial image, numeral 19 denotes a gradation curve after printing 500000 pages when the area percentage of the test patch of the dot image is 50%, numeral 20 denotes a gradation curve after printing 500000 pages when the area percentage of the test patch of the dot image is 20%, and numeral 21 denotes a gradation curve after printing 500000 pages when the area percentage of the test patch of the dot image is 80%.

As shown in FIG. 7, to use the dot image in 50% area percentage as the test patch, the gradation curve after printing 500000 pages shows the tendency of increasing the image density in the dot area percentage range of 0% to 50% and lowering the image density in the dot area percentage range of 50% to 100% relative to the gradation curve of the initial image. At this time, the maximum density difference between the gradation curve of the initial image and the gradation curve after printing 500000 pages was about 0.02 ID. On the other hand, as shown in FIG. 8, to use the dot image in 20% area percentage as the test patch, the image density is lowered in the dot area percentage range of 20% to 100% relative to the gradation curve of the initial image. In this case, the density difference relative to the gradation curve of the initial image becomes large in an area in which the dot area percentage is high, and the maximum density difference between the gradation curve of the initial image and the gradation curve after printing 500000 pages was about 0.05 ID.

On the other hand, as shown in FIG. 9, to use the dot image in 80% area percentage as the test patch, the image density is increased in the dot area percentage range of 0% to 80% relative to the gradation curve of the initial image. In this case, the density difference relative to the gradation curve of the initial image becomes large in an area in which the dot area percentage is low, and the maximum density difference between the gradation curve of the initial image and the gradation curve after printing 500000 pages was about 0.05 ID.

As described above, when the area percentage of the test patch of the dot image formed on the photoconductor is in the vicinity of 50%, the maximum density difference between the gradation curve of the initial image and the gradation curve after printing 500000 pages becomes the minimum and as the area percentage is away from 50%, the maximum density difference between the gradation curves is increased. If the allowable maximum density difference between the gradation curves is 0.03 ID, the area percentage of the test patch of the dot image formed on the photoconductor becomes 40% to 60%.

In the related art, the light exposure amounts of a line image and a dot image part and a solid area (solid image part) are changed at the same time and thus if the image quality in the line image and the dot image part where the range of the influence of the edge effect of the electric field becomes mainly an image area takes precedence over that in the solid area for stabilizing the image quality, the problem of lowering the density in the portion developed by the parallel electric field at the center occurs in the solid area (solid image part) wherein the parallel electric field and the peripheral electric field are mixed. According to the embodiment, however, if change in the charge amount of the developer caused by environment variation or over time or change in the photoconductor characteristic occurs, secularly stable image quality can be kept for all image patterns.

It is desirable that the area percentage of the test patch image of a dot image prepared on the photoconductor should be set to 40% to 60%.

The case where a dot image in a given area percentage is used for an image used as a test patch wherein developing of a peripheral electric field is mainly performed has been described, but a similar advantage can also be provided if a repetitive pattern of line image is used instead of the dot image.

As described above, according to the invention, there can be provided an electrophotographic image formation apparatus for keeping secularly stable image quality for all image patterns if change in the charge amount of a developer caused by environment variation or over time or change in the photoconductor characteristic occurs.

What is claimed is:

1. A control method of an electrophotographic record apparatus, comprising:

detecting a density of a solid test patch image formed on a photoconductor;

controlling a developing bias so that the density of the solid test patch image reaches a predetermined target value;

detecting a density of a dot test patch image in a given area percentage, the dot test patch image formed on the photoconductor while the control condition of the developing bias is maintained; and controlling a light application amount in which a dot image, a thin line image, and an edge of a solid image are exposed to light so that the sensed density of the dot test patch image becomes constant.

2. The control method as claimed in claim 1, further comprising:

changing a grid potential of a scorotron charger for charging the photoconductor so that the difference between the developing bias and the grid potential becomes constant when the developing bias is changed.

3. The control method as claimed in claim 1, wherein the detecting a density of the dot test patch image includes preparing the dot test patch image on the photoconductor in an area percentage of 40% to 60%.

4. A control method of an electrophotographic record apparatus comprising:

detecting a density of a solid test patch image formed on a photoconductor;

controlling a developing bias so that the density of the solid test patch image reaches a predetermined target value;

detecting a density of a dot test patch image in a given area percentage formed, the dot test patch image formed on the photoconductor while the control condition of the developing bias is maintained; and controlling a light application amount in which a dot image is exposed to light so that the sensed density of the dot test patch image becomes constant.

5. An image formation apparatus comprising:

a photoconductor;

a charger for charging the photoconductor;

a light exposure unit for applying light to the photoconductor for forming an electro static latent image; and a developing machine for giving a developer to the electrostatic latent image for forming an image on a surface of the photoconductor;

an image density sensor for detecting a density of an image formed on the photoconductor;

means for controlling a developing bias of the developing machine in a predetermined value based on an output of the image density sensor so that the sensed density of a solid test patch image formed on the photoconductor reaches a predetermined target value;

means for forming a dot test patch image in a given area percentage on the photoconductor while the developing bias is controlled in the predetermined value; and means for controlling the light exposure unit based on output of the image density sensor to expose a dot image, a thin line image, and an edge of a solid image with a light application amount in which the sensed density of the dot test patch image become constant.

6. An image formation apparatus comprising:

a photoconductor;

a charge section for charging a surface of the photoconductor;

a light exposure section for exposing the photoconductor surface to light in a predetermined light exposure amount for forming an electrostatic latent image;

a developing section for depositing toner on the photoconductor for developing;

a detection section for detecting the density of the image provided by the developing section;

a first control section for determining values of a developing bias applied to the developing section and a surface potential of the photoconductor based on first image density information of a first test image detected by the detection section, the first image developed on the photoconductor by a parallel electric field;

a second control section for determining the light exposure amount based on second image density information of a second test image detected by the detection section, the second test image developed on the photoconductor by a peripheral electric field; and a light exposure amount change section for switching a light exposure amount for an image area adjacent to a blank paper portion to the light exposure amount determined by the second control section.

7. The image formation apparatus as claimed in claim 6 wherein the second test image is developed under the developing bias and the surface potential of the photoconductor determined by the first control section.

8. The image formation apparatus as claimed in claim 6, wherein the charger comprises a scorotron charger; and the first control section determines the developing bias by controlling the developing bias along with a grid potential of the scorotron charger in a predetermined condition.

9. The image formation apparatus as claimed in claim 6 wherein the area percentage of the second test image is set to 40% to 60%.

10. The image formation apparatus as claimed in claim 6 wherein the width of the image area is equal to or less than the width of a peripheral electric field occurring in an edge of a solid image.

11. A control method of an electrophotographic record apparatus, comprising:

controlling a developing bias so that a density of a solid test patch image, formed on a photoconductor, reaches a predetermined target value;

detecting a density of a dot test patch image, the dot test patch image being formed on the photoconductor while the control condition of the developing bias is maintained; and controlling a light application amount so that the detected density of the dot test patch image becomes constant.

12. The control method of claim 11, further comprising:

detecting the density of the solid test patch image formed on the photoconductor.

13. The control method of claim 11, wherein said controlling comprises controlling a light application amount in which a dot image, a thin line image, and an edge of a solid image are exposed to light.

14. The control method as claimed in claim 11, further comprising:

changing a grid potential of a charger for charging the photoconductor so that a difference between the developing bias and a grid potential becomes constant when the developing bias is changed.

15. The control method as claimed in claim 11, wherein the detecting of the density of the dot test patch image includes preparing the dot test patch image on the photoconductor in an area percentage of 40% to 60%.

16. A control method of an electrophotographic record apparatus, comprising:

sensing a density of a solid test patch image on a conductive plate;

controlling a developing bias of the solid test patch image based on the density sensed;

sensing a density of a dot test patch image formed on the conductive plate while the developing bias is being controlled; and controlling a light application amount in response to the sensed density of the dot test patch image.

17. A control apparatus for an image formation device including a photoconductor, comprising:

a first controller for controlling a developing bias so that a density of a solid test patch image reaches a predetermined target value;

a detector for detecting a density of a dot test patch image, the dot test patch image being formed on the photoconductor while the first controller is controlling the developing bias; and a second controller for controlling a light application amount so that the sensed density of the dot test patch image becomes constant.

18. The control apparatus according to claim 17, further comprising:

another detector for detecting the density of the solid test patch image formed on the photoconductor.

19. The control apparatus according to claim 17, wherein said second controller controls the light application amount in which a dot image, a thin line image, and an edge of a solid image are exposed to light.

20. The control method of claim 17, further comprising:

a changing unit for changing a grid potential of a charger for charging the photoconductor so that a difference between the developing bias and a grid potential becomes constant when the developing bias is changed, and wherein said detector for detecting the density of the dot test patch image includes a preparation unit for preparing the dot test patch image on the photoconductor in an area percentage of 40% to 60%.

* * * * *